April 26, 1960     O. M. LEWIS     2,934,137
DEVICE FOR MOUNTING A TIRE ON A VEHICLE WHEEL
Filed July 15, 1958     2 Sheets-Sheet 1
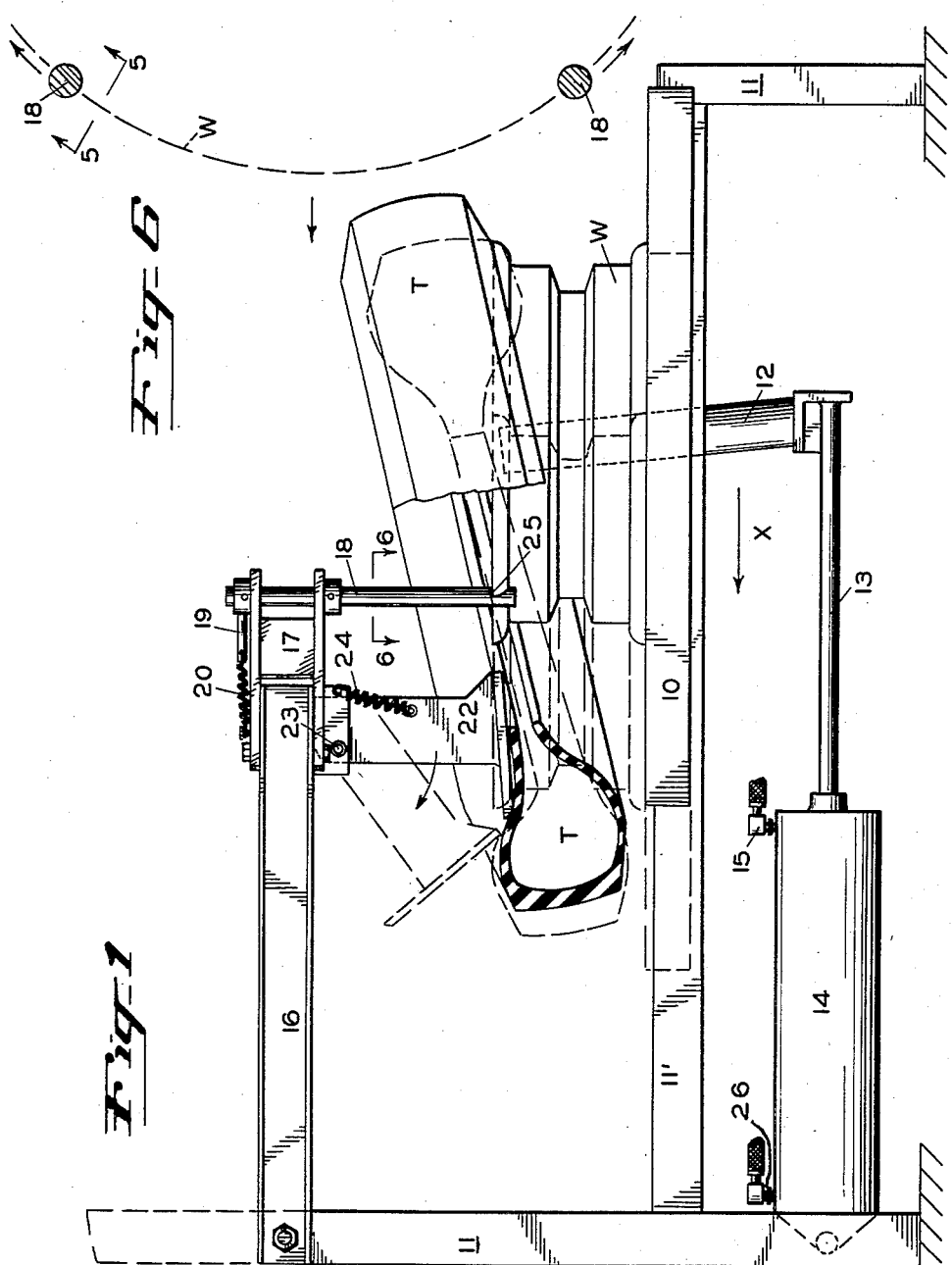
INVENTOR.
ORVAL M. LEWIS
BY
*T.R.Geisler*
ATTORNEY.

April 26, 1960  O. M. LEWIS  2,934,137
DEVICE FOR MOUNTING A TIRE ON A VEHICLE WHEEL
Filed July 15, 1958  2 Sheets-Sheet 2
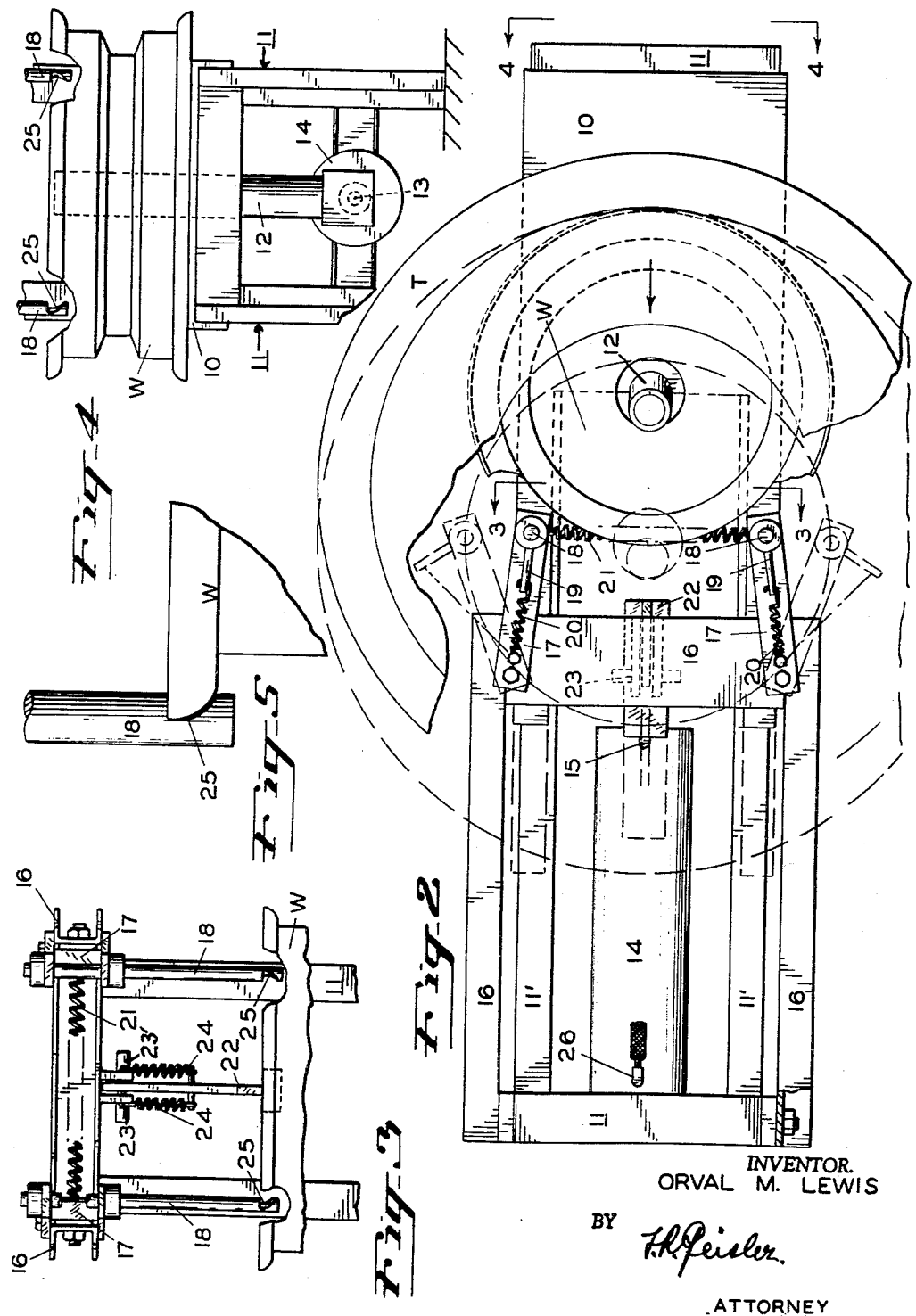
INVENTOR.
ORVAL M. LEWIS
BY
ATTORNEY

United States Patent Office 2,934,137
Patented Apr. 26, 1960

2,934,137

DEVICE FOR MOUNTING A TIRE ON A VEHICLE WHEEL

Orval M. Lewis, Sweet Home, Oreg.

Application July 15, 1958, Serial No. 748,634

4 Claims. (Cl. 157—1.24)

This invention relates to means for mounting tires on vehicle wheels and relates especially to means for mounting tubeless tires on vehicle wheels of the "drop center" type.

An object of the present invention is to provide a simple and practical device which can be used for vehicle tires of any size and weight within the customary range of vehicle wheel tires, and which will enable a single operator to mount a tire on a vehicle wheel with very little physical effort and with only a minimum expenditure of time.

Another object of the invention is to provide a tire mounting device which will be operated mainly by air under pressure and consequently can be employed at any location where a supply of air under pressure, such as would be sufficient for the inflating of vehicle tires is available.

A special object of this invention is to provide a tire mounting device in which a horizontally movable carriage will be employed for holding and moving the vehicle wheel during the tire mounting operation, such as the wheel-supporting carriage and operating means for the carriage described in my companion application No. 748,733 filed currently with this application and entitled "Device for Collapsing and Removing a Vehicle Wheel Tire"; thus enabling the same carriage assembly to be used as a part of both devices in the performance of the respective operations for which the devices have been designed and consequently making a saving in cost for the two devices when used together and reducing the amount of space required for them.

The objects of the present invention and other advantages are achieved with the employment of the tire mounting means, constructed as hereinafter briefly described, and operated in the manner to be explained.

Reference is to be made to the accompanying drawings, in which:

Fig. 1 is an elevation of the device showing a vehicle wheel on the device and a tire placed on top of the wheel preparatory to being mounted on the wheel, the full lines showing the position of certain parts of the device and the position of the wheel and tire at the start of the tire mounting operation, and the broken lines indicating a subsequent position of the same during a slightly later stage of operation;

Fig. 2 is a top plan view corresponding to Fig. 1, with a portion of the tire and wheel rim broken away for clarity and also similarly indicating in broken lines the subsequent position of the wheel and tire;

Fig. 3 is a fragmentary elevation taken on line 3—3 of Fig. 2;

Fig. 4 is a fragmentary elevation on line 4—4 of Fig. 2;

Fig. 5 is an enlarged fragmentary view of one of the wheel rim-engaging rods taken on line 5—5 of Fig. 6 but drawn to a larger scale; and Fig. 6 is a diagrammatic view illustrating the action of the wheel rim-engaging rods.

Referring first to Figs. 1 and 2, a stationary main frame assembly is indicated in general by the reference character 11. The carriage 10 is slidably mounted on a pair of parallel horizontal rails 11' forming part of said main frame, the carriage being slidable to a limited extent towards the left, as viewed in these figures, from the initial starting position shown in full lines. During the tire mounting operation the carriage is thus moved in the direction indicated by the arrow x in Fig. 1.

A post 12 is rigidly mounted on the carriage 10 and extends up above the carriage for a short distance approximately equal to the thickness of an average vehicle wheel, and extends through the hub of the vehicle wheel when the wheel W is set on the device for the purpose of having a tire T mounted on the wheel. Preferably this post 12 is inclined slightly in the direction in which the carriage and wheel are moved during the tire mounting operation, and thus is inclined to the left as viewed in Fig. 1. This inclination of the post prevents any tendency which the vehicle wheel might have to slide upwardly on the post while the tire is being thrust on the wheel.

A piston rod 13 from a piston in the air cylinder 14 is connected to the bottom of the post 12 so as to cause the carriage 10, and with it the wheel W on the carriage, to move to the left as viewed in Fig. 1 when compressed air is delivered into the right-hand end of the cylinder 14 through the port 15.

A substantially U-shaped bracket 16 is hingedly mounted on a pair of uprights which form part of the stationary main frame 11 and which form the left-hand end of the main frame as viewed in Fig. 1. This bracket 16 is adapted to be swung down from vertical position into substantially horizontal position, and thus into the position shown in the figures, when the tire T has been placed on the wheel W and is ready to be mounted on the wheel. The bracket 16 supports a pair of spaced identical arm assemblies 17 which are pivotally mounted on the bracket 16 to swing substantially in the plane of the bracket. Each arm assembly carries a rotatably mounted rod 18 adapted for engagement with the top rim of the wheel W on the carriage 10. For this purpose each of the rods 18 has a rim-engaging recess 25 (shown best in Fig. 5) near the lower end of the rod. The two arm assemblies 17 are connected by a coil spring 21 (Figs. 2 and 3), exerting a force to move the arm assemblies towards each other to the extent permitted by stops (not shown), which springs hold the arm assemblies normally in the position shown in full lines in Fig. 2 but permit the arm assemblies to swing outwardly when forced to do so.

A short bar 19 (Figs. 1 and 2) is rigidly secured to the upper end of each of the rotatably mounted rods 18, and a coil spring 20 is attached to each bar 19. The other ends of the coil springs 20 are anchored on the respective arm assemblies 17. The purpose of this arrangement is to permit limited rotation of the rods 18, as presently described, as the result of their engagement with the wheel rim, and to cause the rods to return to normal starting position when they are not in contact with the wheel rim.

A presser foot 22, shown most clearly in Figs. 1 and 3, is pivotally mounted on a hinge pin 23 so as to swing in a vertical plane, the hinge pin extending through a pair of lugs 23' mounted centrally on the underside of the bracket 16. A pair of springs 24 normally hold the presser foot perpendicular to the bracket 16 and thus in the full line position shown in Fig. 1, but permit the presser foot to be swung temporarily against the force of the springs 24 as indicated by the broken lines in Fig. 1. The presser foot is formed with a bottom flange adapted to rest on the top face of the tire and to hold the contact portion of the tire down temporarily until the movement of the wheel and tire, as presently explained, pushes the presser foot out of position when it is no longer needed for the purpose of holding the tire down.

The operation of the device briefly takes place as follows:

The wheel W on which it is desired to mount the tire T is placed on the carriage 10 with the post 12 extending up through the central hub portion of the wheel. The tire T is placed on the wheel in the position shown in full lines in Fig. 1. The bracket 16 is swung down and the recesses 25 of the two rods 18 are brought into engagement with the top rim of the wheel, extending down inside the upper bead of the tire. The engagement of these recesses on the rods 18 with the wheel rim holds the bracket 16 in proper operating position with respect to the wheel and causes the presser foot 22 to rest firmly down on the top face of the tire at the start of the operation. The presser foot prevents this lowered top face of the tire from moving up over the top rim of the wheel. With the tire and the members of the device in this position, compressed air is then delivered into the right-hand end of the cylinder 14 through the port 15. This causes the piston in the cylinder 14, and with it the piston rod 13, post 12, carriage 10, and wheel W, to move towards the left. Since the bracket 16 remains stationary this movement of the vehicle wheel W forces the rim-engaging rods 18 to start moving around the top rim of the wheel in opposite directions. This movement of the rim-engaging rods 18 is illustrated diagrammatically in Fig. 6.

The pressure of the wheel rim against these rods 18 holds the recesses 25 of the rods in engagement with the rim and, as the rods travel around on the moving wheel, the rods will be rotated slightly by their contact with the wheel rim. Since these rods 18 are located inside the top bead of the tire the movement of the carriage 10 and wheel W to the left will result in the rods 18 attempting to move the tire relatively in the opposite direction. This would at first cause the tire to slide up over the top of the wheel were it not for the fact that the presser foot 22 holds the lower portion of the tire down until such time as the pull on the tire prevents this portion of the tire from moving above the top rim of the wheel. Then as the rods 18 continue their travel on the wheel rim, the tire bead is forced to slide downwardly on these rods until the entire tire has been brought down under the top rim of the wheel. This will occur by the time the two rods 18 have almost reached diametrically opposite positions on the wheel rim.

With the movement of the wheel W to the left and the slightly opposite movement of the tire, the presser foot 22 swings to the left as viewed in Fig. 1, but, as it starts to do so first presses the top bead of the tire down under the top rim of the advancing wheel. Then the presser foot, when no longer required for holding the tire down, continues to be pushed towards the left until it is free of the tire.

When the tire has been entirely mounted on the wheel the carriage 10 is returned to the right or to starting position by the delivery of compressed air into the left end of the cylinder 14 through the port 26 and the exhaust of the air from the cylinder through the port 15. The presser foot and the rods 18 return to their starting positions under the force of their various springs. The control of the delivery of air into the cylinder 14 is accomplished through the medium of suitable control valves (not shown) of well known construction which need not be described and which do not constitute any part of the invention.

It would be possible to make various minor modifications in some of the elements of the device without departing from the principle of the invention. As will be apparent, the entire operation is accomplished in a very short period of time.

I claim:

1. In a tire mounting device of the character described, a carriage mounted for movement in a substantially horizontal direction, means for moving said carriage in said direction and for returning said carriage to the starting position, a post on said carriage arranged for engagement with the hub portion of a vehicle wheel placed upon said carriage for holding the wheel on said carriage during the tire mounting operation, a pair of wheel rim-engaging rods, supporting means for said rods pivotally supported above said carriage, said rods extending downwardly from said supporting means for engagement with a vehicle wheel placed over the post on said carriage, means on said rods for guiding said rods along the top rim of said wheel when said wheel is moved against said rods, spring means exerting a force to hold said supporting means in normal position with said rods positioned on opposite sides of the line of travel of said post on said carriage, said supporting means swingable laterally outwardly against the force of said spring means whereby to enable said rods to move around on said rim of said wheel in opposite directions respectively when said wheel is moved forwardly against said rods, and means located ahead of said rods in the path of said wheel for engaging the top face of a tire on said wheel to hold a portion of the top face of a tire down below said rim of said wheel when said rods are brought to engagement with said rim.

2. In a tire mounting device of the character described, a main frame, a carriage mounted on said main frame, means for moving said carriage in a substantially horizontal direction, related means for returning said carriage to the starting position, means for holding a vehicle wheel on said carriage, a pair of rim-engaging rods, a pair of arm assemblies supporting said rods positioned above said carriage, said rods extending downwardly from said arm assemblies respectively for engagement with the top rim of the vehicle wheel secured on said carriage, means on said rods for guiding said rods along said rim of said wheel when said wheel is moved against said rods, spring means exerting a force to hold said arm assemblies in normal position with said rods positioned on opposite sides of the center line of travel of said wheel with said carriage, said arm assemblies swingable laterally outwardly against the force of said spring means, whereby to enable said rods to move around on said rim of said wheel in opposite directions respectively when said wheel is moved forwardly against said rods, a bracket on said main frame positioned above the path of travel of said carriage, said arm assemblies for said rods pivotally mounted on said bracket, and a presser foot extending downwardly from said bracket and located ahead of said rods in the path of said wheel for engaging the top face of a tire on said wheel to hold a portion of the top face of the tire down below said rim when said rods are brought into engagement with said wheel, whereby, when said wheel is set in place on said carriage and a tire is positioned on said wheel with the forward portion of said tire below said top rim of said wheel and beneath said presser foot and said rods engage said rim, the forward travel of said wheel with said carriage will cause said rods to force the tire entirely down below said wheel rim.

3. In a device for mounting a tire on a vehicle wheel, a stationary main frame assembly, a carriage mounted on said main frame for movement in a substantially horizontal direction, pneumatic means for moving said carriage in said direction, related means returning said carriage to starting position, means for holding a vehicle wheel on said carriage, a pair of wheel rim-engaging rods, supporting means for said rods positioned above said carriage, said rods extending downwardly from said rod-supporting means for engagement with the top rim of the vehicle wheel secured on said carriage, said rods formed with recesses for guiding said rods along said rim of said wheel when said wheel is moved against said rods, spring means exerting a force to hold said rod-supporting means in normal position with said rods positioned on opposite sides of the center line of travel of said wheel with said carriage, said rod-supporting means swingable laterally outwardly against the force of said spring means whereby to enable said rods to move around on said rim of said wheel in opposite directions respectively when said wheel is moved forwardly against said rods, said rods mounted in said rod-supporting means for limited rotation, spring means normally holding said rods against rotation but enabling said rods to be rotated against the force of said latter mentioned spring means when said rods are moved around on said rim of said wheel, a bracket on said main frame assembly positioned above the path of travel of said carriage, said rod-supporting means pivotally supported on said bracket, and means extending downwardly from said bracket and located ahead of said rods in the path of said wheel for engaging the top face of a tire on said wheel to hold a portion of the top face of the tire down below said top rim of said wheel when said rods are brought into engagement with said rim, whereby, when said wheel is set in place on said carriage and a tire is positioned on said wheel with the forward portion of said tire below said top rim and beneath said latter mentioned means and said rods engage said rim, the forward travel of said wheel with said carriage will cause said rods to force the tire entirely down below said wheel rim.

4. A device for mounting a tire on a vehicle wheel including a stationary main frame, a carriage mounted on said frame for movement in a substantially horizontal direction, pneumatic means for moving said carriage in said direction and for returning said carriage to starting position, a post on said carriage arranged for engagement with the hub portion of a vehicle wheel placed upon said carriage for holding the wheel on said carriage during the tire mounting operation, a pair of wheel rim-engaging rods, a pair of arm assemblies supporting said rods positioned above said carriage, said rods extending downwardly from said arm assemblies respectively for engagement with the top rim of the vehicle wheel placed over said post on said carriage, said rods formed with recesses for guiding said rods along said rim when said wheel is moved against said rods, spring means exerting a force to hold said arm assemblies in normal position with said rods positioned on opposite sides of the line of travel of said post on said carriage, said arm assemblies swingable laterally outwardly against the force of said spring means, whereby to enable said rods to move around on said rim in opposite directions respectively when said wheel is moved forwardly against said rods, said rods mounted in said arm assemblies for limited rotation, spring means normally holding said rods against rotation but enabling said rods to be rotated against the force of said latter mentioned spring means when said rods are moved around on said rim, a hinged bracket on said main frame assembly movable into position above the path of travel of said carriage, said arm assemblies for said rods pivotally mounted on said bracket, and a presser foot extending downwardly from said bracket and located ahead of said rods in the path of said wheel for engaging the top face of the tire on said wheel to hold a portion of the top face of the tire down below said top rim when said rods are brought into engagement with said rim, said presser foot hinged to said bracket so as to swing in the direction of travel of said wheel as said wheel is moved, whereby, when said wheel is set in place on said carriage and a tire is positioned on said wheel with the forward portion of said tire below the top rim of said wheel and beneath said presser foot and said rods engage said rim, the forward travel of said wheel with said carriage will cause said rods to force the tire entirely down below said wheel rim.

References Cited in the file of this patent
UNITED STATES PATENTS

| 2,464,092 | Kroll et al. | Mar. 8, 1949 |
| 2,816,604 | Greenley et al. | Dec. 17, 1957 |
| 2,817,394 | Kriebel et al. | Dec. 24, 1957 |